(12) United States Patent
Carmen, Jr.

(10) Patent No.: US 7,723,939 B2
(45) Date of Patent: May 25, 2010

(54) RADIO-FREQUENCY CONTROLLED MOTORIZED ROLLER SHADE

(75) Inventor: Lawrence R. Carmen, Jr., Bath, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 401 days.

(21) Appl. No.: 11/751,901

(22) Filed: May 22, 2007

(65) Prior Publication Data

US 2007/0273309 A1 Nov. 29, 2007

Related U.S. Application Data

(60) Provisional application No. 60/802,869, filed on May 23, 2006.

(51) Int. Cl.
*G05B 5/00* (2006.01)

(52) U.S. Cl. .......................... 318/466; 318/16; 318/266

(58) Field of Classification Search ................ 318/466, 318/16, 266, 280, 469, 468, 467, 480; 160/1
See application file for complete search history.

(56) References Cited

U.S. PATENT DOCUMENTS

| | | |
|---|---|---|
| 4,864,588 A | 9/1989 | Simpson et al. |
| 4,932,037 A | 6/1990 | Simpson et al. |
| 4,995,053 A | 2/1991 | Simpson et al. |
| 5,239,205 A | 8/1993 | Hoffman et al. |
| 5,340,954 A | 8/1994 | Hoffman et al. |
| 5,467,266 A | 11/1995 | Jacobs et al. |
| 5,671,387 A | 9/1997 | Jacobs et al. |
| 5,736,965 A | 4/1998 | Mosebrook et al. |
| 5,818,128 A | 10/1998 | Hoffman et al. |
| 5,838,226 A | 11/1998 | Houggy et al. |
| 5,848,054 A | 12/1998 | Mosebrook et al. |
| 5,848,634 A | 12/1998 | Will et al. |
| 5,905,442 A | 5/1999 | Mosebrook et al. |
| 5,969,492 A | 10/1999 | Motte et al. |
| 5,982,103 A | 11/1999 | Mosebrook et al. |
| 6,100,659 A | 8/2000 | Will et al. |
| 6,201,364 B1 | 3/2001 | Will et al. |
| 6,497,267 B1 | 12/2002 | Azar et al. |
| 6,687,487 B1 | 2/2004 | Mosebrook et al. |
| 6,803,728 B2 | 10/2004 | Balasubramaniam et al. |
| 6,983,783 B2 | 1/2006 | Carmen, Jr. et al. |
| 7,030,578 B2 | 4/2006 | Orsat |
| 7,034,899 B2 | 4/2006 | Symoen et al. |

(Continued)

OTHER PUBLICATIONS

Somfy Systems, Inc., CT32-RT Series Brochure, Dec. 2005, 4 pages.

(Continued)

*Primary Examiner*—Karen Masih
(74) *Attorney, Agent, or Firm*—Ostrolenk Faber LLP

(57) ABSTRACT

A roller shade structure controlled by radio-frequency (RF) wireless communication from a control device comprises a roller tube and a conductive enclosure. The conductive enclosure is mounted inside the roller tube for enclosing a motor drive system having a motor operable to controllably rotate the roller tube in a direction at a speed when a voltage is applied to the motor. A capacitive coupling is provided between the enclosure and the roller tube, the capacitive coupling providing an increased signal strength of RF signals received by the RF receiver.

20 Claims, 9 Drawing Sheets

U.S. PATENT DOCUMENTS

| | | |
|---|---|---|
| 7,071,836 B2 | 7/2006 | Baud et al. |
| 7,079,045 B2 | 7/2006 | Baud et al. |
| 7,106,261 B2 | 9/2006 | Nagel et al. |
| 7,151,464 B2 | 12/2006 | Ramus |
| 2004/0129849 A1* | 7/2004 | Walker et al. ............... 248/266 |
| 2004/0162040 A1 | 8/2004 | Ramus |
| 2005/0173080 A1 | 8/2005 | Carmen, Jr. et al. |
| 2005/0215210 A1 | 9/2005 | Walker et al. |
| 2005/0280598 A1 | 12/2005 | Webb et al. |
| 2006/0232233 A1 | 10/2006 | Adams et al. |
| 2006/0232234 A1 | 10/2006 | Newman, Jr. |
| 2006/0273970 A1 | 12/2006 | Mosebrook et al. |
| 2007/0085755 A1 | 4/2007 | Webb et al. |

OTHER PUBLICATIONS

Somfy Systems, Inc., LT3O-RT Series Brochure, Aug. 2005, 2 pages.

Somfy Systems, Inc., Multi-Link Control Systems Brochure, Sep. 2005, 4 pages.

Somfy Systems, Inc., Somfy Product Catalog, Dec. 2003, pp. 1-12.

Somfy Systems, Inc., Orea RTS Motor Programming and Limit Setting Instructions, Feb. 2003, 7 pages.

Somfy Systems, Inc., LT RTS CMO Motor Programming and Limit Setting Instructions, Apr. 2002, 6 pages.

Somfy Systems, Inc., Inteo DC Headrail Control Installation and Operating Instructions, Aug. 2003, 2 pages.

Elero USA, Inc., ITec Advanced RF Products Brochure, Jan. 2006, 4 pages.

Elero USA, Inc., ITec Motors Products Bulletin, Jan. 2006, 2 pages.

Elero USA, Inc., The Combio 915 Products Bulletin, Oct. 2006, 2 pages.

Tong Eann Shutters Co., Ltd., Product Catalog, Nov. 5, 2005, 26 pages.

* cited by examiner

US 7,723,939 B2

RADIO-FREQUENCY CONTROLLED MOTORIZED ROLLER SHADE

RELATED APPLICATION

This application claims priority from commonly-assigned U.S. Provisional Patent Application Ser. No. 60/802,869, filed May 23, 2006, having the same title as the present invention, the entire disclosure of which is hereby incorporated by reference.

BACKGROUND OF THE INVENTION

1. Field of the Invention

The present invention relates to radio-frequency (RF) controlled devices, and more specifically, to RF load control devices for motorized roller shades.

2. Description of the Related Art

Control systems for controlling electrical loads, such as lights, motorized window treatments, and fans, are known. Such control systems often use radio-frequency (RF) transmission to provide wireless communication between the control devices of the system. One example of an RF lighting control system is disclosed in commonly-assigned U.S. Pat. No. 5,905,442, issued on May 18, 1999, entitled METHOD AND APPARATUS FOR CONTROLLING AND DETERMINING THE STATUS OF ELECTRICAL DEVICES FROM REMOTE LOCATIONS, the entire disclosure of which is incorporated herein by reference.

The RF lighting control system of the '442 patent includes wall-mounted load control devices, table-top and wall-mounted master controls, and signal repeaters. Each of the load control devices includes a user interface and an integral dimmer circuit for controlling the intensity of an attached lighting load. The user interface has a pushbutton actuator for providing on/off control of the attached lighting load and a raise/lower actuator for adjusting the intensity of the attached lighting load. The table-top and wall-mounted master controls have a plurality of buttons and are operable to transmit RF signals to the load control devices to control the intensities of the lighting loads. The signal repeaters help to ensure error-free communication such that every component of the system will receive the RF communication signals intended for that component.

The control devices of the RF lighting control system include RF antennas adapted to transmit and receive the RF signals that provide for communication between the control devices of the lighting control system.

It is desirable to control the position of motorized window treatments, such as roller shades, as part of the RF lighting control system. Standard motorized roller shades comprise a flexible shade fabric wound around a roller tube. The roller tube is rotated by a motor, which is controlled by a controller. Preferably, the controller and the motor are located in an enclosure that is mounted inside of the roller tube. The controller must include an antenna and an RF transceiver in order to communicate with the components of the RF lighting control system. An example of a motorized roller shade for a wired control system is disclosed in commonly-assigned U.S. Pat. No. 6,983,783, issued Jan. 10, 2006, entitled MOTORIZED SHADE CONTROL SYSTEM, the entire disclosure of which is hereby incorporated by reference.

However, a typical roller tube is made of metal that acts as a shield which interferes with the RF communications. The roller tube attenuates the external RF signals that the antenna and the RF transceiver should receive. Also, since the enclosure is located inside the roller tube, noise from internal sources, such as motor brushes and switching circuits (such as, for example, switching power supplies) is directed towards the RF transceiver and increases detection errors at the RF transceiver. Accordingly, reliable RF communications are typically difficult to establish between the RF controller of the motorized roller shade and the other control devices of the RF lighting control system.

Therefore, there is a need for a motorized roller shade that is operable to reliably communicate in an RF control system. Specifically, there is a need for a motorized roller shade that has a controller and an RF transceiver mounted inside the roller tube and an antenna that allows for reliable communications with the RF transceiver.

SUMMARY OF THE INVENTION

According to a first embodiment of the present invention, a roller shade structure controlled by radio-frequency (RF) wireless communication from a control device comprises a roller tube and a conductive enclosure. The conductive enclosure is mounted inside the roller tube for enclosing a motor drive system having a motor operable to controllably rotate the roller tube in a direction at a speed when a voltage is applied to the motor. A capacitive coupling is provided between the enclosure and the roller tube, the capacitive coupling providing an increased signal strength of RF signals received by the RF receiver.

According to a second embodiment of the present invention, a roller shade structure comprises a roller for winding the shade, a circuit board, an antenna, and an electrically conductive enclosure for the motor and circuit board. The circuit board is attached to the motor and has a motor drive circuit and a filter circuit for reducing RF noise generated by the motor drive circuit and the motor. The circuit board also has an RF receiver for receiving RF control signals for controlling the motor. The antenna is coupled to the RF receiver for providing the control signals to the receiver and extends from the roller. The roller and the enclosure are electrically coupled by a low impedance at the RF frequency of the control signals.

Other features and advantages of the present invention will become apparent from the following description of the invention that refers to the accompanying drawings.

DETAILED DESCRIPTION OF THE INVENTION

Figure 1:
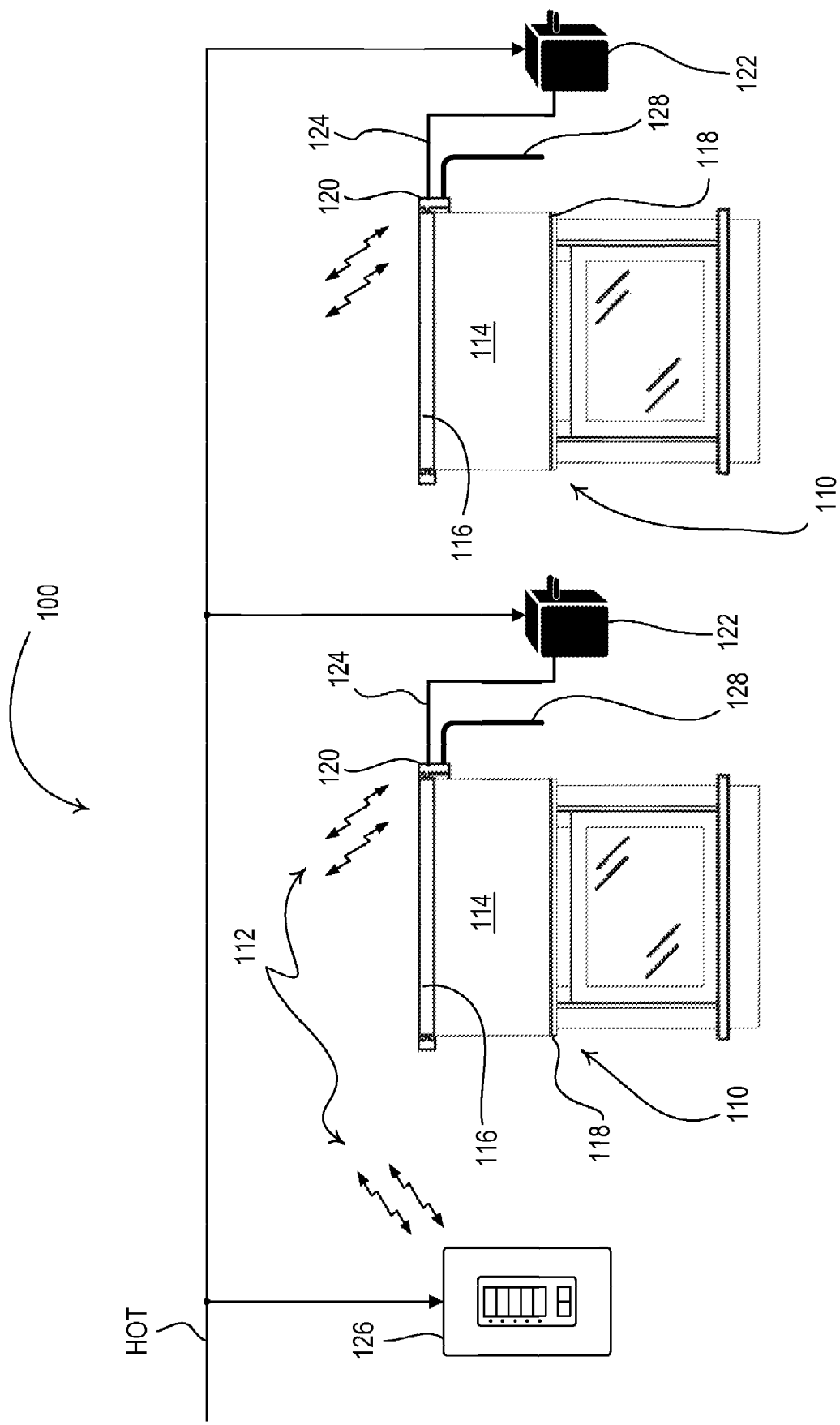
FIG. 1 is a simplified block diagram of an RF control system for a plurality of motorized window treatments according to the present invention.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

FIG. 1 is a simplified block diagram of an RF control system 100 for a plurality of motorized window treatments 110 according to the present invention. The RF lighting control system 100 includes a HOT connection to a source of AC power (not shown) for powering the motorized window treatments 110. The RF lighting control system 100 utilizes an RF communication link for communication of RF signals 112 between control devices of the system.

Each motorized window treatment 110 comprises a flexible shade fabric 114 rotatably supported by a roller tube 116 and having a hembar 118 at the lower edge of the fabric. The motorized window treatments 110 are controlled by electronic drive units (EDUs) 120. Transformers 122 generate a $24V_{AC}$ voltage to power the electronic drive units 120 and are connected to the electronic drive units via a power wire 124. The electronic drive units 120 are operable to control the shade fabric 112 between an open position and a closed position. The motorized window treatments are operable to receive the RF signals 122 from a keypad 126 via an antenna 128.

Figure 2:
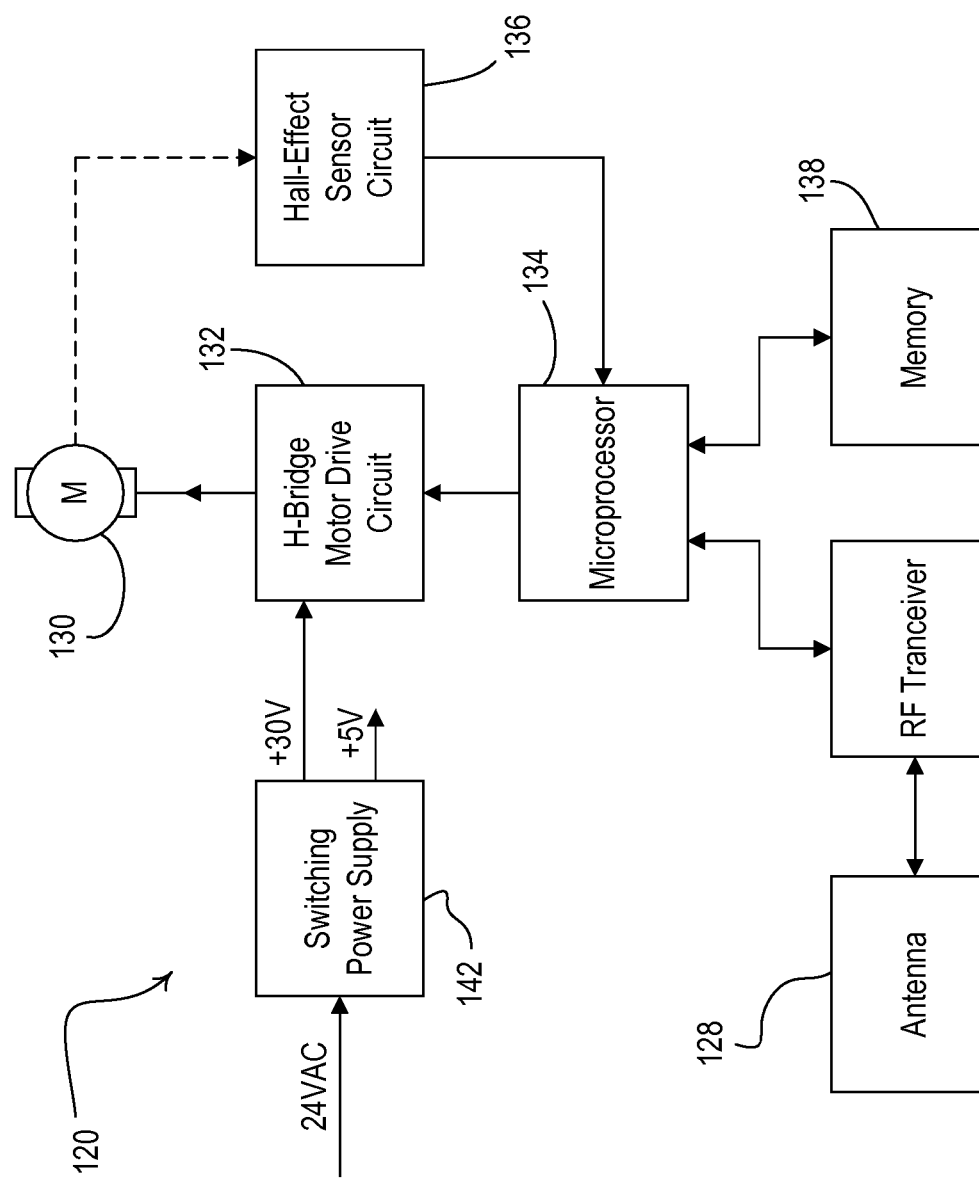
FIG. 2 is a simplified block diagram of an electronic drive unit of one of the motorized window treatments of FIG. 1 according to the present invention.

FIG. 2 is a simplified block diagram of the electronic drive unit 120 of the motorized window treatment 110 according to the present invention. A direct-current (DC) motor 130 (e.g., a DC brush motor) is coupled to the roller tube 114 and is operable to controllably rotate the roller tube at a constant speed when a constant DC voltage is applied to the motor. Changing the DC voltage applied to the DC motor 130 will change the rotational speed of the motor. Further, the DC motor 130 is operable to change the direction of rotation in response to a change in the polarity of the DC voltage applied to the DC motor, i.e., by applying a negative DC voltage to the motor.

To accomplish this level of control of the DC motor 130, the motor is coupled to an H-bridge motor drive circuit 132, which is driven by a microcontroller 134. The H-bridge motor drive circuit 132 comprises four transistors, e.g., four field effect transistors (not shown). The transistors are coupled such that a positive DC voltage is applied to the DC motor 130 when two of the transistors are conductive, i.e., the DC motor rotates in a forward direction. When the other two transistors of the H-bridge circuit 132 are conductive, a negative DC voltage is applied to the DC motor 130, which accordingly rotates in the reverse direction. To control the speed of the DC motor 130, the microcontroller 134 preferably drives the H-bridge circuit 132 with a pulse-width-modulated (PWM) signal. The microcontroller 134 may be any suitable controller, such as a programmable logic device (PLD), a microprocessor, or an application specific integrated circuit (ASIC).

Figure 3:
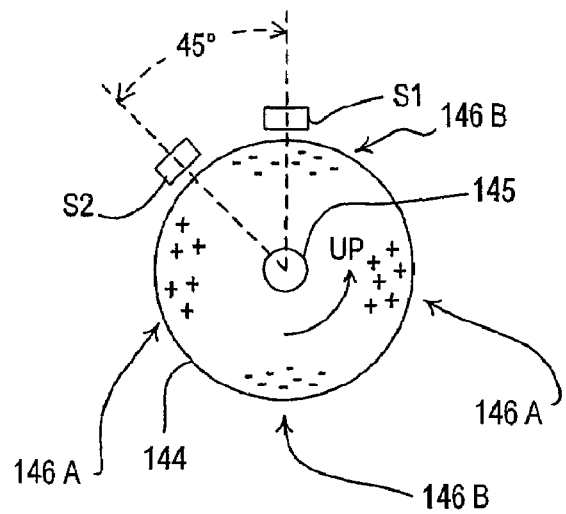
FIG. 3 is a partial end view showing the physical assembly of a Hall effect sensor circuit of the electronic drive unit of FIG. 2.

The electronic drive unit 120 includes a Hall effect sensor circuit 136, which is operable to provide information regarding the rotational speed and the direction of the DC motor 130 to the microcontroller 134. FIG. 3 is a partial end view of the electronic drive unit 120 showing the physical assembly of the Hall effect sensor circuit 136. The Hall effect sensor circuit 136 comprises two Hall effect sensors S1, S2. The sensors S1, S2 are located in close proximity with a sensor magnet 144, which is secured to an output shaft 145 of the motor 130. The sensors S1, S2 are located adjacent the periphery of the magnet 144 and are separated from each other by 45°. The sensor magnet 144 includes two positive poles 146A (i.e., "north" poles) and two negative poles 146B (i.e., "south" poles). Alternatively, the sensor magnet 144 may only include one positive pole and one negative pole.

Figure 4:
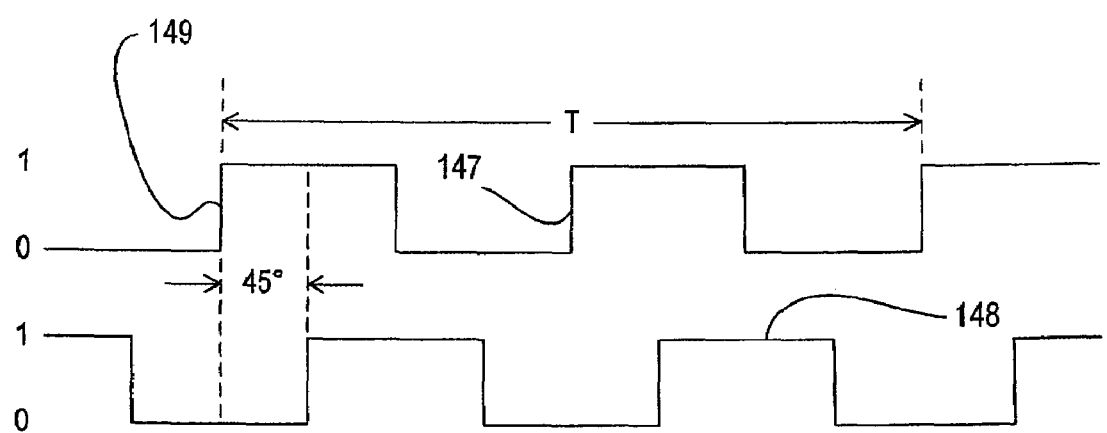
FIG. 4 is a diagram of output signals of the Hall effect sensor circuit of FIG. 2.

FIG. 4 is a diagram of a first output signal 147 and a second output signal 148 of the sensors S1, S2, respectively. The sensors S1, S2 provide the output signals 147, 148 to the microcontroller 134 as a train of pulses in dependence upon whether each of the sensors are close to one of the positive poles 146A or one of the negative poles 146B. For example, when the sensor magnet 144 rotates such that one of the north poles 146A moves near the first sensor S1 (rather than one of the adjacent negative poles 146B), the first output signal 147 will transition from low (i.e., a logic zero) to high (i.e., a logic one) as shown by the edge 149 in FIG. 4. When the sensor magnet 144 has two positive poles and two negative poles, the output signals 147, 148 have two rising edges and two falling edges per revolution of the output shaft 145.

The frequency of the pulses of the output signals 147, 148 is a function of the rotational speed of the motor output shaft 145. The period T (shown in FIG. 3) represents one full rotation of the output shaft 145 of the motor 130. The relative spacing between the pulses of the first and second output signals 147, 148 is a function of rotational direction. When the motor 130 is rotating in an upwards direction, i.e., corresponding to the counterclockwise direction of the motor output shaft 145 marked "UP" in FIG. 3, the second output signal 148 will lag behind the first output signal 147 by approximately 45° or ⅛ of the period T. The operation of the H-bridge motor drive circuit 132 and the Hall effect sensor circuit 136 of the electronic drive unit 120 is described in greater detail in commonly-assigned U.S. Pat. No. 5,848,634, issued Dec. 15, 1998, entitled MOTORIZED WINDOW SHADE SYSTEM, the entire disclosure of which is herein incorporated by reference.

Referring back to FIG. 2, a memory 138 is coupled to the microcontroller 134 and is operable to store a number H of Hall effect sensors edges between the present position of the shade fabric and the closed position. A Hall effect sensor edge is, for example, a low-to-high transition of the first output signal 147 as shown in FIG. 4. The electronic drive unit 120 further comprises an RF transceiver 140, which allows the microcontroller 134 to transmit and receive the RF communication signals 112 to and from the keypad 126 and other electronic drive units 120. The RF transceiver is coupled to the antenna 128. A switching power supply 142 receives a $24V_{AC}$ signal from the transformer 122 and generates a $30V_{DC}$ voltage for powering the H-bridge motor drive circuit 132, and thus the motor 130, and a $5V_{DC}$ voltage for powering the other components, i.e., the microcontroller 134, the memory 138, and the RF transceiver 140.

Figure 5:
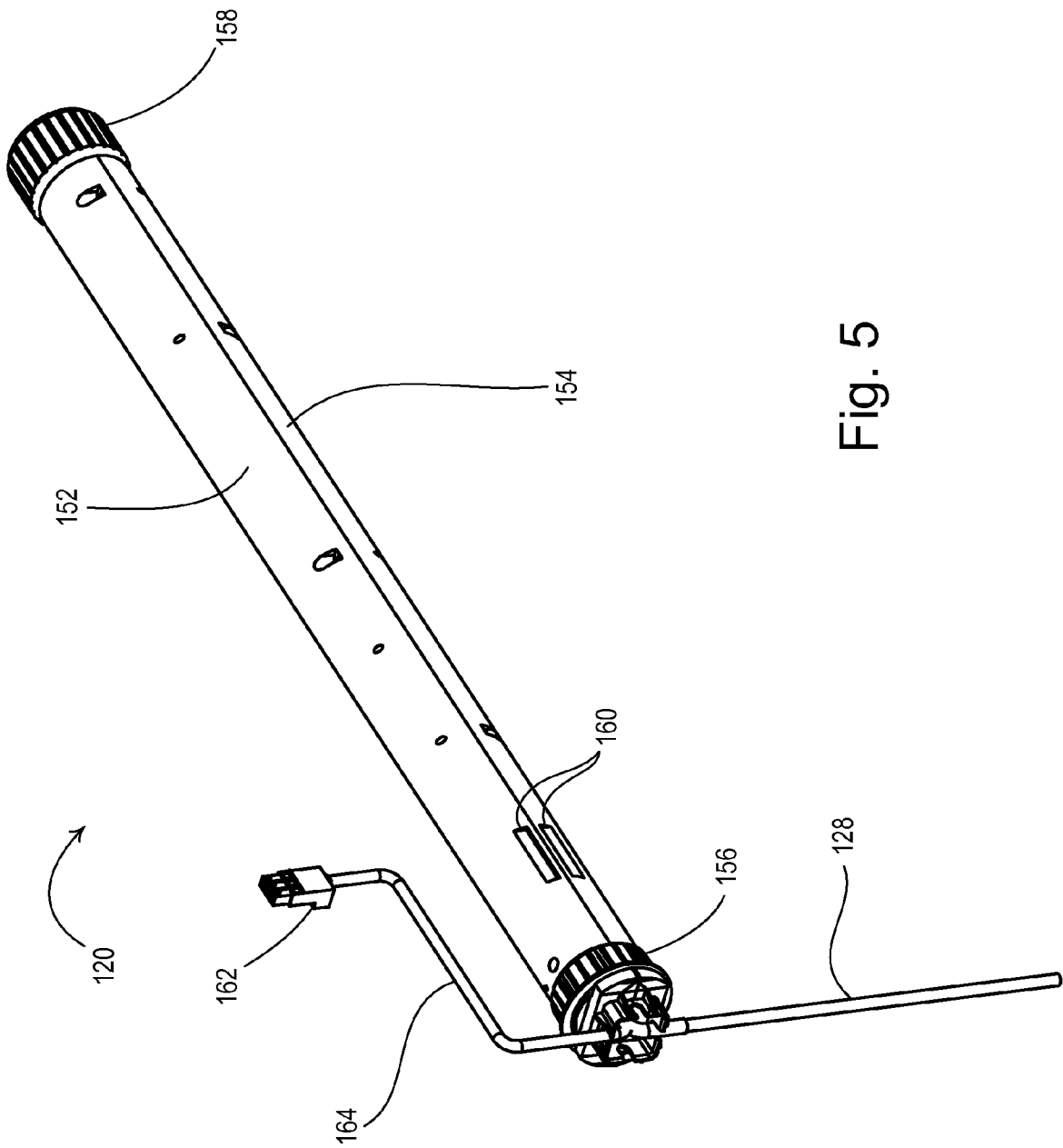
FIG. 5 is an isometric view of the electronic drive unit of FIG. 2 according to the present invention.
Figure 6A:
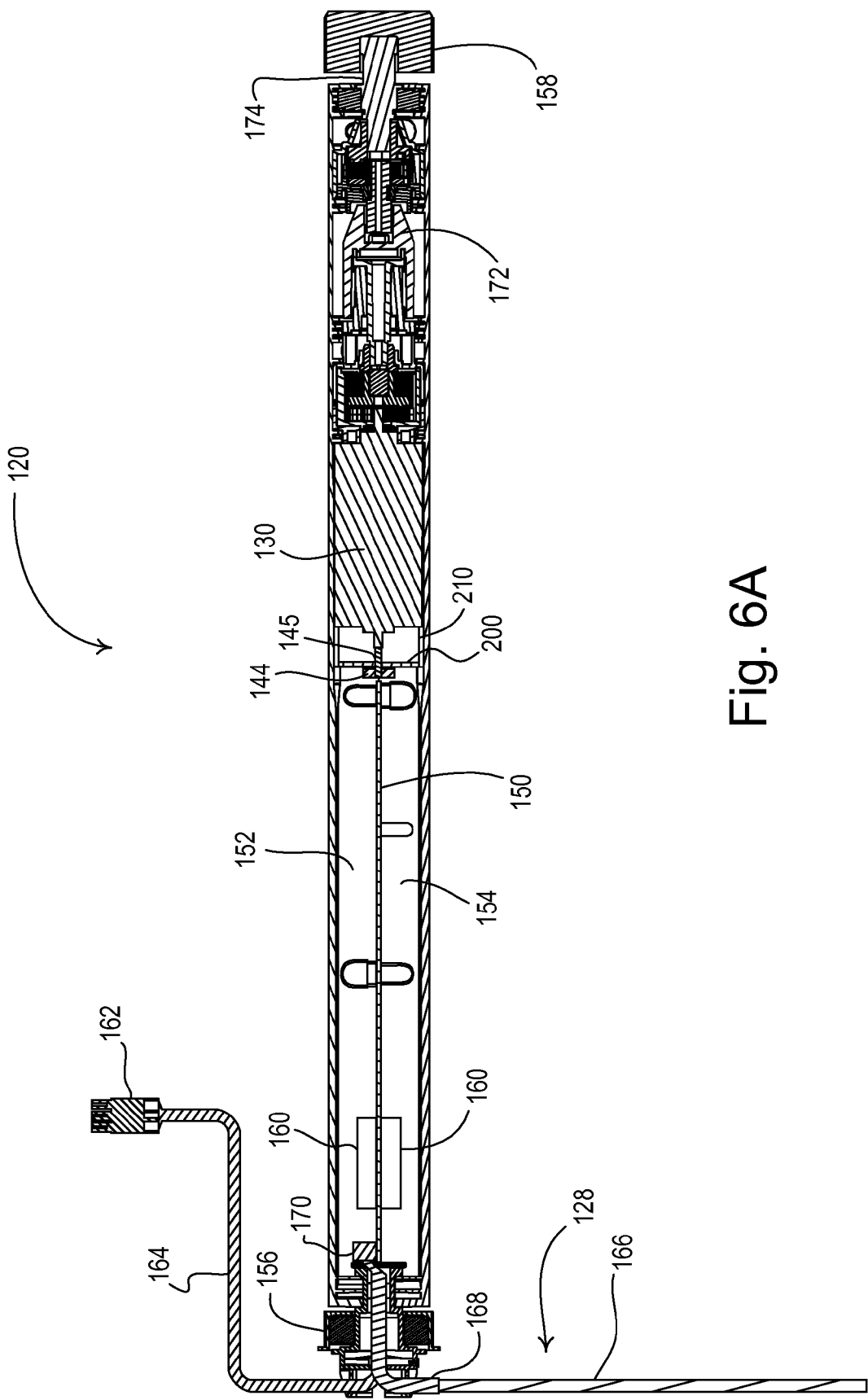
FIG. 6A is a side cross-sectional view through the center of the electronic drive unit of FIG. 2.
Figure 6B:
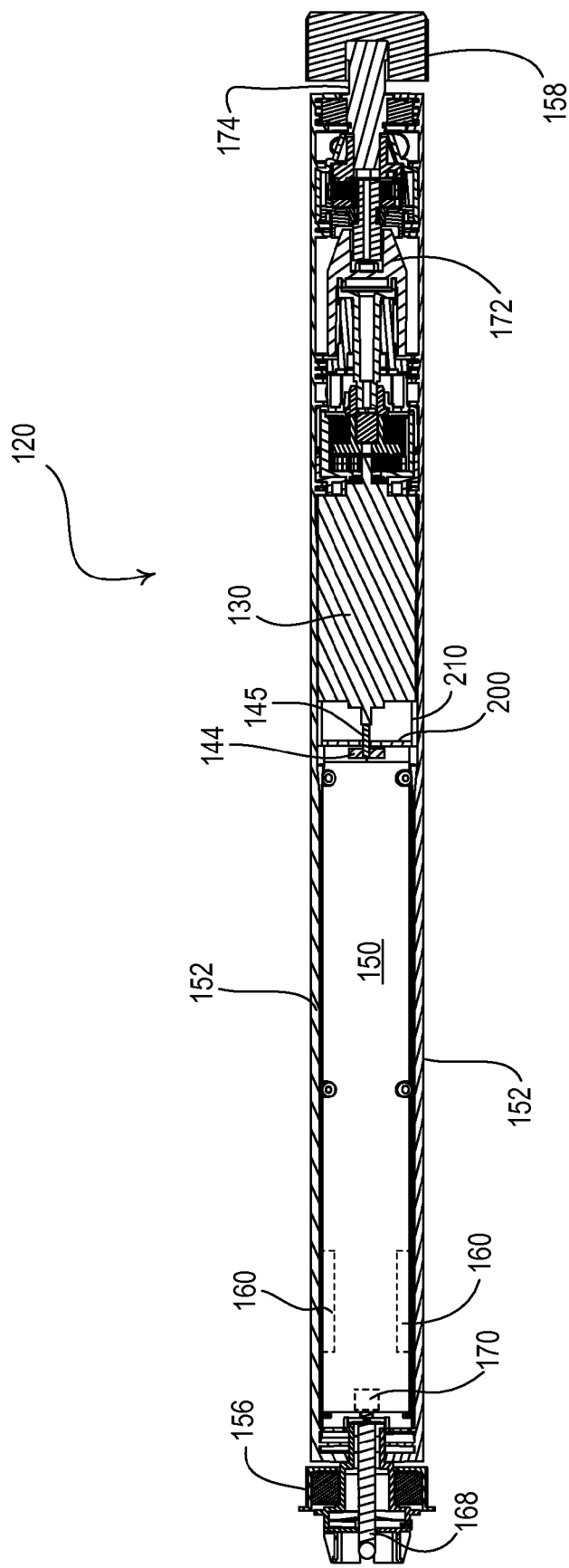
FIG. 6B is a bottom cross-sectional view through the center of the electronic drive unit of FIG. 2.

FIG. 5 is an isometric view of the electronic drive unit 120 of one of the motorized window treatments 110 according to the present invention. FIG. 6A is a side cross-sectional view through the center of the electronic drive unit 120. FIG. 6B is a bottom cross-sectional view through the center of the electronic drive unit 120.

The electrical components (i.e., the H-bridge motor drive circuit 132, the microcontroller 134, the Hall effect sensor circuit 136, the memory 138, the RF transceiver 140, and the switching power supply 142) are mounted on a printed circuit board (PCB) 150. The PCB is housed inside a first half 152 and a second half 154 of an enclosure of the electronic drive unit 120. The first and second halves 152, 154 of the enclosure of the electronic drive unit 120 are preferably manufactured from a conductive material, e.g., aluminum. Alternatively, the first and second halves 152, 154 of the enclosure of the electronic drive unit 120 may be made of a non-conductive material, (e.g., plastic), and coated with a conductive substance or paint. The circuit common on the PCB 150 is electrically connected to the first and second halves 152, 154 of the enclosure via clamps 160. The power supply 142 on the PCB is connected to the power wire 124 of the transformer 122 via a connector 162 and a cord 164. The motor shaft 145 extends from the motor 130 towards the PCB 150. The sensor magnet 144 is located near the PCB 150 and the sensors S1, S2 (FIG. 3) are mounted on the PCB 150 in close proximity to the sensor magnet 144.

The antenna 128 and the cord 164 extend from a first end 156 of the electronic drive unit 120. The first end 156 is operable to extend from an end of the roller tube 116, such that the antenna 128 is not located inside the roller tube. The electronic drive unit further comprises an output shaft 174 connected to a bearing 158. The motor 130 is coupled to the output shaft 174 through a gear mechanism 172. The bearing 158 is coupled to the roller tube 116, such that when the output shaft 174 and the bearing 158 rotate, the roller tube also rotates.

The antenna 128 comprises an insulated wire portion 166 and a coaxial cable portion 168. The coaxial cable portion 168 is coupled to a connector 170, which is mounted on the PCB 150. The coaxial cable portion 168 extends from the outside of the electronic drive unit 120 to the connector 170, to minimize the amount of noise that is coupled into the antenna 128. The noise sources in the electronic drive unit 120 include the switching power supply 142 and the motor 130. The coaxial cable portion 168 comprises a piece of standard coaxial cable, which includes a conductor for carrying the RF signal from the antenna wire portion 166 to the RF transceiver 140 and a shield, which surrounds the conductor and is coupled to circuit common on the PCB 150.

Figure 7:
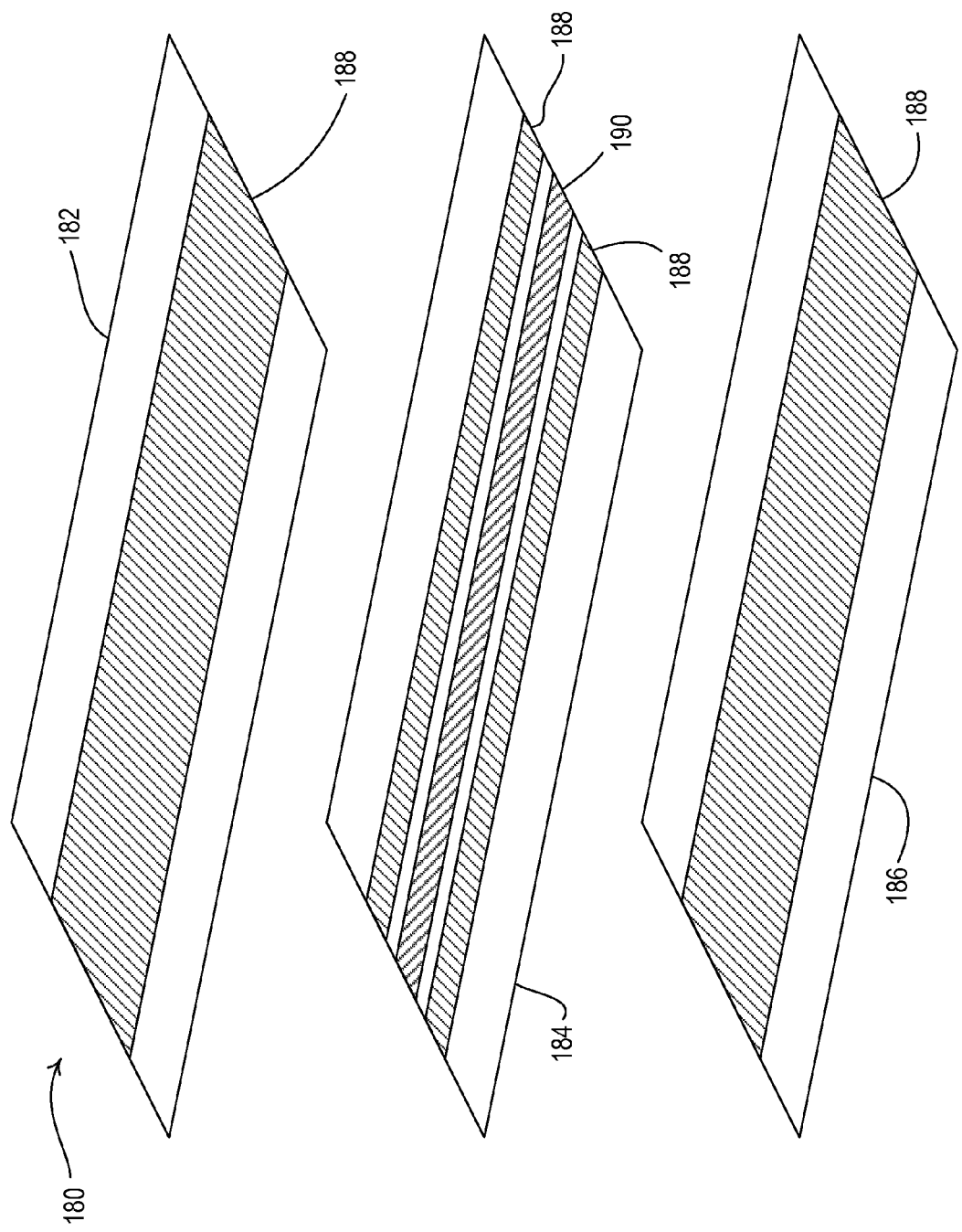
FIG. 7 is an exploded view of a coaxial PCB portion of an antenna of the electronic drive unit of FIG. 2.

The antenna 128 further comprises a coaxial PCB portion 180, which is illustrated in FIG. 7. The coaxial PCB portion 180 extends from the connector 170 to the RF transceiver 140 on the PCB 150. As with the coaxial cable portion 168, the coaxial PCB portion 180 limits the amount of noise coupled into the antenna 128. The coaxial cable portion 168 comprises at least three layers 182, 184, 186 of the PCB 150. The first layer 182 and the third layer 186 comprise ground planes 188, which are connected to circuit common of the PCB 150. The second layer 184 comprises a signal trace 190, surrounded by two ground planes 188. The resulting structure is one that resembles a standard coaxial cable—a conductor, i.e., the signal trace 190, surrounded on all sides by a shield, i.e., the ground planes 188.

Referring back to FIGS. 6A and 6B, the electronic drive unit 120 further comprises a shield PCB 200. The shield PCB 200 is located in a plane substantially parallel with the plane of the sensor magnet 144, such that the motor shaft 145 extends through the center of the shield PCB along an axis substantially perpendicular to the plane of the shield PCB. The shield PCB 200 is surrounded by a conductive shield structure 210. The shield structure 210 extends cylindrically along the axis of the motor shaft 145 from the shield PCB 200 to the motor 130. The shield structure 210 is connected to the first and second halves 152, 154 of the enclosure of the electronic drive unit 120, and thus, to circuit common. Accordingly, the shield PCB 200 is held in a fixed position by the shield structure 210. Since the shield structure 210 is coupled to circuit common, the shield structure 210 operates to shield the electrical components of the PCB 150 (specifically, the microcontroller 134 and the RF transceiver 140) from the brush noise generated by the motor 130 during operation.

Figure 8A:
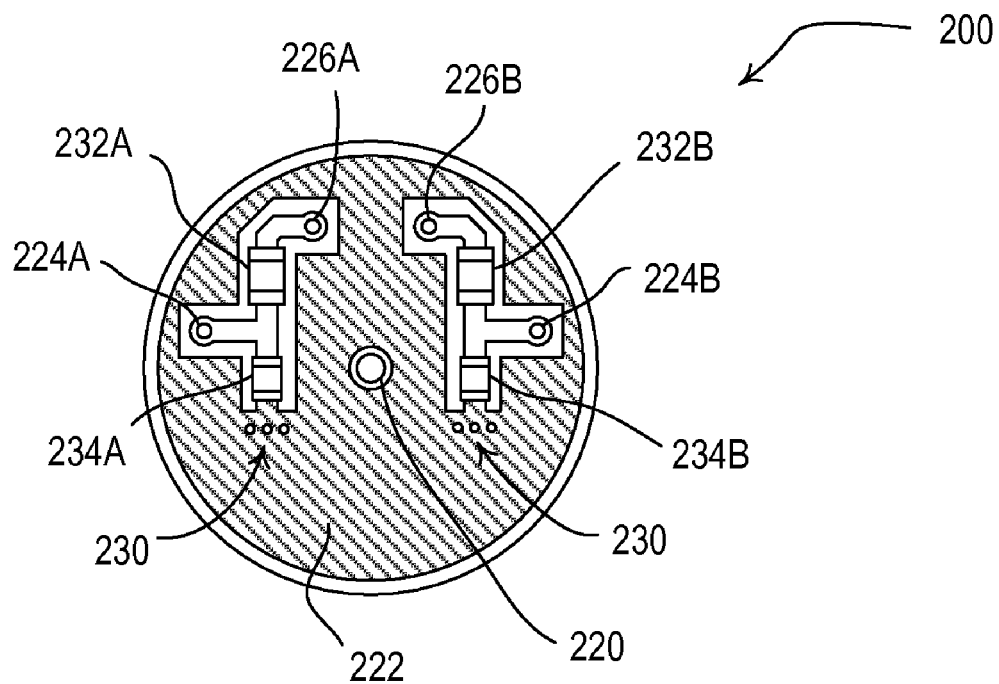
FIG. 8A is a top side view of a shield PCB of the electronic drive unit of FIG. 2.
Figure 8B:
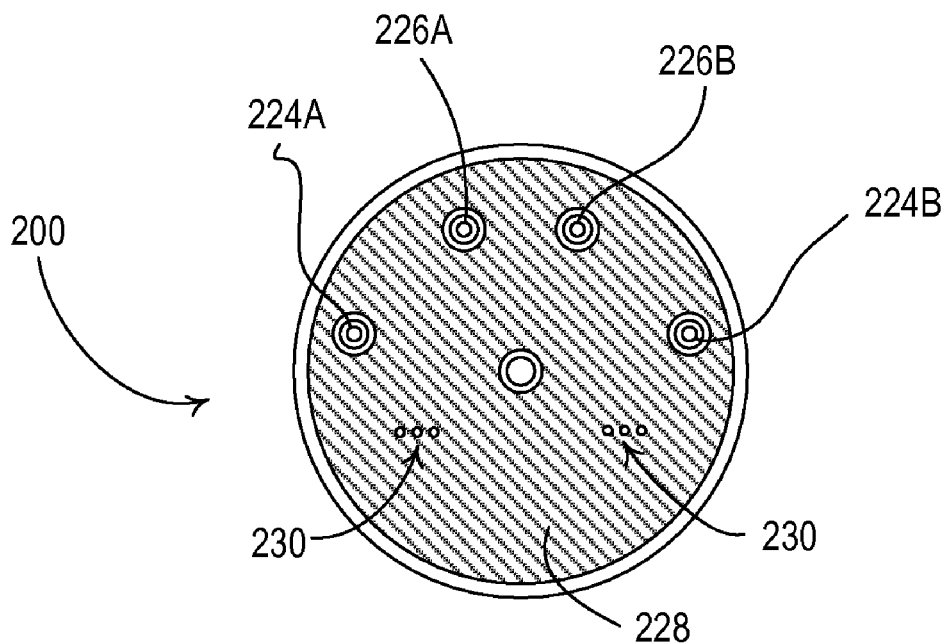
FIG. 8B is a bottom side view of a shield PCB of the electronic drive unit of FIG. 2.

FIG. 8A is a top side view and FIG. 8B is a bottom side view of the shield PCB 200. The shield PCB 200 has a substantially circular periphery to allow the shield PCB to be mounted between the first and second halves 152, 154 of the enclosure of the electronic drive unit 120. When installed, the top side of the shield PCB 200 faces away from the motor 130 and the bottom side faces toward the motor 130. The shield PCB 200 has an opening 220 at the center for receipt of the motor shaft 145. The top side of the shield PCB 200 comprises a first ground plane 222, which is coupled to circuit common. A first motor through-hole 224A and a second motor through-hole 224B are provided to allow for connection to the leads of the motor 130 (i.e., to provide power to the motor). A first PCB through-hole 226A and a second PCB through-hole 226B are provided to allow for connection to the PCB 150 via wires (not shown), such that the H-bridge motor drive circuit 132 is operable to drive the motor 130. The bottom side of the shield PCB 200 comprises a second ground plane 228, which is coupled to the first ground plane 222, for example, through a plurality of vias 230 (i.e., conductive, plated through-holes).

The top side of the shield PCB 200 further comprises two LC filters between the first and second motor through-holes 224A, 224B and the first and second PCB through-holes 226A, 226B, respectively (i.e., between the motor 130 and the PCB 150). The first LC filter includes a first inductor 232A coupled between the first motor through-hole 224A and the first PCB through-hole 226A and a first capacitor 234A coupled between the first motor through-hole 224A and circuit common. The second LC filter includes a second inductor 232B coupled between the second motor through-hole 224B and the second PCB through-hole 226B and a second capacitor 234B coupled between the second motor through-hole 224B and circuit common. The LC filters provide additional isolation between the motor 130 and the electrical components of the PCB 150 to prevent the brush noise generated by the DC brush motor 130 from being coupled back through the wires connected to the PCB through-holes 226A, 226B and onto the PCB 150, which could affect the operation of the microcontroller 134 and the RF transceiver 140.

Figure 9:
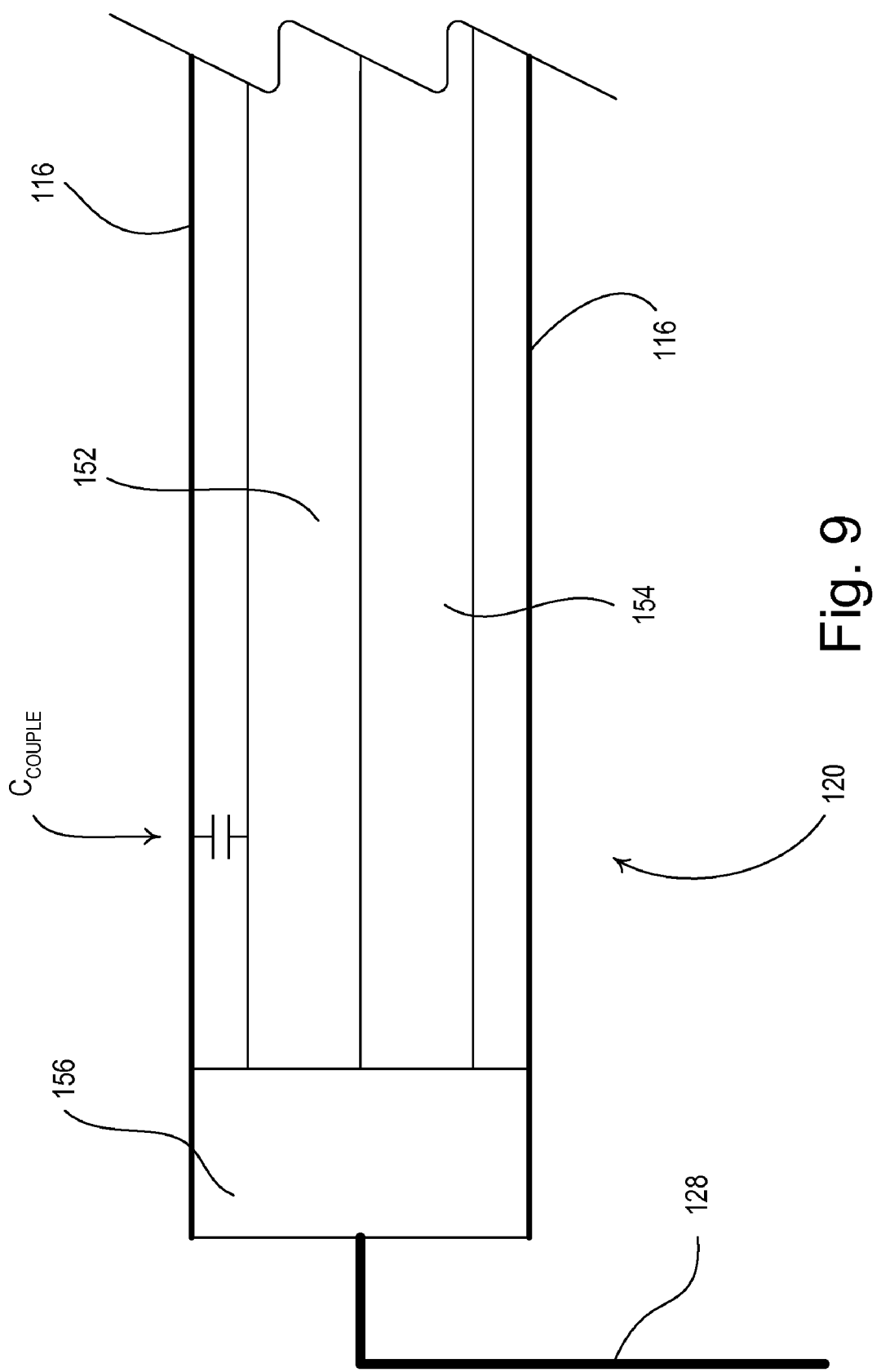
FIG. 9 is a partial side view of the electronic drive unit of FIG. 2, illustrating a capacitive coupling between the electronic drive unit and a roller tube.

FIG. 9 is a partial side view of the electronic drive unit 120 showing the electronic drive unit mounted inside the roller tube 116. Since the first and second halves 152, 154 of the enclosure are conductive, there is a capacitive coupling (represented by a capacitance $C_{COUPLE}$) between the first and second halves 152, 154 of the enclosure and the roller tube 116. Because the first and second halves 152, 154 of the enclosure are connected to the circuit common of the PCB 150 and the circuit common of the antenna 128, the capacitive coupling provides for an increased signal strength of the RF signals received at the RF transceiver 140.

Measurements were taken of the RF reception range of both an electronic drive unit having a conductive enclosure according to the present invention (i.e., the electronic drive unit 120) and an electronic drive unit having a non-conductive enclosure (i.e., according to the prior art). For both measurements, RF signals were transmitted from an RF transmitting device to the electronic drive units at various distances until the maximum distances at which the electronic drive units were responsive to the RF signals were found. It was discovered that using the conductive enclosure according to the present invention approximately doubled the reception range between the RF transmitting device and the electronic drive unit. For example, the electronic drive unit 120 having the conductive enclosure received RF signals when the RF transmitting device was positioned away up to a maximum distance of 597 feet from the electronic drive unit. The electronic drive unit having the non-conductive enclosure could receive RF signals only up to a maximum distance of 242 feet away from the RF transmitting device.

According to an example embodiment of the present invention, the first and second halves 152, 154 of the enclosure of the electronic drive unit 120 each have a length L of approximately 17 inches and a radius $R_1$ of approximately 0.7 inch. The capacitance $C_{COUPLE}$ of the capacitive coupling can be theoretically calculated using $$C_{COUPLE} = \frac{2 \cdot \pi \cdot \varepsilon_0 \cdot L}{\ln(R_2/R_1)}, \quad \text{(Equation 1)}$$

where $R_2$ is the inner radius of the roller tube 116 and $\varepsilon_0$ is the permittivity of free space, i.e., $8.854187817 \cdot 10^{-12} C^2/(N \cdot m^2)$. If the diameter D of the roller tube 116 (i.e., $D=2 \cdot R_2$) is approximately 1.5 inches, the theoretical value of the capacitance $C_{COUPLE}$ is approximately 350 pF. However, the actual capacitance $C_{COUPLE}$ of the capacitive coupling may be different than this theoretical value and may range between 100 pF and 5 nF.

The present invention is not limited by the example dimensions provided for the first and second halves 152, 154 of the enclosure and the roller tube 116. The sizes of the first and second halves 152, 154 of the enclosure and the roller tube 116 could be increased or decreased, while considering the effects on the capacitance $C_{COUPLE}$ of the capacitive coupling (using Equation 1 above). For example, if the diameter D of the roller tube 116 is increased, the length L and the radius $R_1$ of each of the first and second halves 152, 154 of the enclosure could also be increased in order to obtain a similar theoretical value of the capacitance $C_{COUPLE}$ as determined by Equation 1 above.

The present invention is also not limited by the values of the capacitance $C_{COUPLE}$ of the capacitive coupling presented herein. The capacitance $C_{COUPLE}$ of the capacitive coupling could be changed to other values, while still maintaining the significant improvement in the RF reception range as shown above.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A roller shade structure controlled by radio-frequency (RF) wireless communication from a control device, the structure comprising:
   a roller tube; and
   a conductive enclosure mounted inside the roller tube for enclosing a motor drive system having an RF receiver and a motor operable to controllably rotate the roller tube in a direction at a speed when a voltage is applied to the motor;
   wherein a capacitive coupling is provided between the enclosure and the roller tube, the capacitive coupling providing an increased signal strength of RF signals received by the RF receiver.

2. The structure of claim 1, wherein the motor drive system comprises:
   a direct-current motor coupled to be driven by a Half-bridge motor drive circuit;
   a microcontroller coupled to control the motor drive circuit and coupled to the RF receiver;
   a Hall effect sensor circuit coupled to provide motor position signals to the microcontroller;
   a memory coupled to the microcontroller; and
   a switching power supply coupled to supply power to the microcontroller and the motor drive circuit.

3. The structure of claim 1, wherein the motor drive system is mounted on a printed circuit board (PCB) having a circuit common, the PCB being housed inside the enclosure, the circuit common being electrically connected to the enclosure.

4. The structure of claim 3, wherein the enclosure includes first and second halves that are manufactured from a conductive material.

5. The structure of claim 3, wherein the enclosure includes clamps adapted to electrically connect the circuit common to the enclosure.

6. The structure of claim 5, further comprising an antenna extending exteriorally of the roller shade structure.

7. The structure of claim 6, wherein the antenna comprises an insulated wire portion and a coaxial cable portion coupled to a connector mounted on the PCB, the coaxial cable portion extending from exteriorally of the roller shade structure to the connector.

8. The structure of claim 7, wherein the antenna further comprises a coaxial PCB portion including a plurality of layers, the coaxial PCB portion extending from the connector to the RF transceiver.

9. The structure of claim 8, wherein the coaxial PCB portion includes top and bottom ground plane layers connected to the circuit common, and a middle layer including a signal trace surrounded by two ground planes, the two ground planes connected to the circuit common.

10. The structure of claim 2, wherein the motor drive system further comprises a bearing coupled to the roller tube and to an output shaft connected to the motor through a gear mechanism, wherein the motor drive system rotates the roller tube through the output shaft and the bearing.

11. The structure of claim 2, wherein the capacitive coupling has a capacitance of approximately 350 pF.

12. A roller shade structure comprising:
   a roller tube for winding the shade;
   a motor inside the roller coupled to the roller tube for driving the roller tube in rotation;
   a circuit board attached to the motor having a motor drive circuit thereon and a filter circuit for reducing RF noise generated by the motor drive circuit and the motor, the circuit board further having an RF receiver thereon for receiving RF control signals for controlling the motor;
   an antenna coupled to the RF receiver for providing the control signals to the receiver, the antenna extending from the roller tube; and
   an electrically conductive enclosure for the motor and circuit board, the circuit board being mounted inside the enclosure;
   wherein the roller tube and the enclosure are electrically coupled by a low impedance at the RF frequency of the control signals.

13. The roller shade structure of claim 11, wherein the roller tube and the enclosure are capacitively coupled.

14. The roller shade structure of claim 12, wherein the capacitive coupling is obtained by making the roller tube electrically conductive.

15. The roller shade structure of claim 13, wherein the roller tube is metal.

16. The roller shade structure of claim 13, wherein the roller tube is coated with an electrically conductive material.

17. The roller shade structure of claim 15, wherein the roller tube is electrically insulating.

18. The roller shade structure of claim 12, wherein the enclosure is coupled to a circuit common of the circuit board.

19. The roller shade structure of claim 12, wherein the antenna comprises a length of coaxial cable having a shield.

20. The roller shade structure of claim 18, wherein a portion of the shield of the coaxial cable is removed.

* * * * *